US009567245B2

(12) United States Patent
Jenkins et al.

(10) Patent No.: US 9,567,245 B2
(45) Date of Patent: Feb. 14, 2017

(54) SYSTEMS AND METHODS FOR AUTOMATED CONTROL OF MIXING AERATION IN TREATMENT PROCESSES

(71) Applicants: Theodore K. Jenkins, Charleston, SC (US); Robert Elliott Locklair, Summerville, SC (US); Stuart F. Humphries, Sandy Springs, SC (US)

(72) Inventors: Theodore K. Jenkins, Charleston, SC (US); Robert Elliott Locklair, Summerville, SC (US); Stuart F. Humphries, Sandy Springs, SC (US)

(73) Assignee: EnviroMix, Inc., Charleston, SC (US)

( * ) Notice: Subject to any disclaimer, the term of this patent is extended or adjusted under 35 U.S.C. 154(b) by 0 days.

(21) Appl. No.: 14/147,209

(22) Filed: Jan. 3, 2014

(65) Prior Publication Data

US 2015/0048026 A1    Feb. 19, 2015

Related U.S. Application Data

(63) Continuation of application No. 13/591,509, filed on Aug. 22, 2012, now abandoned, which is a continuation of application No. 13/252,905, filed on Oct. 4, 2011, now Pat. No. 8,323,498.

(60) Provisional application No. 61/389,645, filed on Oct. 4, 2010.

(51) Int. Cl.
*C02F 3/00* (2006.01)
*C02F 3/30* (2006.01)

(52) U.S. Cl.
CPC ............... *C02F 3/006* (2013.01); *C02F 3/302* (2013.01); *C02F 2209/005* (2013.01); *C02F 2209/04* (2013.01); *C02F 2209/15* (2013.01); *C02F 2209/22* (2013.01); *Y02W 10/15* (2015.05)

(58) Field of Classification Search
CPC ................................. C02F 3/006; C02F 3/302
USPC .................................................. 210/739, 746
See application file for complete search history.

(56) References Cited

U.S. PATENT DOCUMENTS

| 4,595,296 | A |   | 6/1986  | Parks |
|-----------|---|---|---------|-------|
| 5,133,876 | A |   | 7/1992  | Tharp |
| 5,304,308 | A | * | 4/1994  | Tsumura et al. ............... 210/614 |
| 5,482,630 | A | * | 1/1996  | Lee et al. ...................... 210/605 |
| 5,536,409 | A |   | 7/1996  | Dunkers |
| 5,558,763 | A |   | 9/1996  | Funakoshi et al. |
| 5,582,734 | A |   | 12/1996 | Coleman et al. |
| 5,624,565 | A | * | 4/1997  | Lefevre et al. ............... 210/614 |
| 5,639,373 | A |   | 6/1997  | Mahendran et al. |
| 5,733,456 | A |   | 3/1998  | Okey et al. |

(Continued)

FOREIGN PATENT DOCUMENTS

EP    1992946 A1    11/2008
GB     717464 A     10/1954

(Continued)

OTHER PUBLICATIONS

Arnold, Ph.D., William A., "Phi-RPT-002; CFD Analysis of Large Bubble Mixing," ZIN Technologies, Phi Engineering Support, Jun. 26, 2006.

(Continued)

*Primary Examiner* — Chester Barry
(74) *Attorney, Agent, or Firm* — Nelson Mullins Riley & Scarborough, LLP

(57) ABSTRACT

A system and method for automatically controlling aeration and mixing processes are disclosed.

18 Claims, 8 Drawing Sheets

(56) References Cited

U.S. PATENT DOCUMENTS

| | | | |
|---|---|---|---|
| 5,783,083 | A | 7/1998 | Henshaw et al. |
| 5,910,250 | A | 6/1999 | Mahendran et al. |
| 5,989,428 | A * | 11/1999 | Goronszy .................. 210/605 |
| 6,042,677 | A | 3/2000 | Mahendran et al. |
| 6,245,239 | B1 | 6/2001 | Cote et al. |
| 6,280,636 | B1 | 8/2001 | Locklair |
| 6,282,636 | B1 | 8/2001 | Yeh et al. |
| 6,294,039 | B1 | 9/2001 | Mahendran et al. |
| 6,350,747 | B1 | 2/2002 | Glennon et al. |
| 6,426,004 | B1 | 7/2002 | Hiatt et al. |
| 6,475,395 | B1 | 11/2002 | Schmit et al. |
| 6,550,747 | B2 | 4/2003 | Rabie et al. |
| 6,609,070 | B1 | 8/2003 | Lueck |
| 6,620,319 | B2 | 9/2003 | Behmann et al. |
| 6,629,773 | B2 | 10/2003 | Parks |
| 6,650,747 | B1 | 11/2003 | Bala et al. |
| 6,682,652 | B2 | 1/2004 | Mahendran et al. |
| 6,808,629 | B2 * | 10/2004 | Wouters-Wasiak et al. . 210/605 |
| 6,863,810 | B2 | 3/2005 | Chann |
| 6,882,419 | B2 | 4/2005 | Coleman et al. |
| 6,964,741 | B2 | 11/2005 | Mahendran et al. |
| 7,282,141 | B2 | 10/2007 | Koopmans et al. |
| 7,374,675 | B2 | 5/2008 | Koopmans et al. |
| 7,396,453 | B1 | 7/2008 | Probst |
| 7,427,354 | B2 | 9/2008 | Eto |
| 7,476,322 | B2 | 1/2009 | Dimitriou et al. |
| 7,524,419 | B2 | 4/2009 | Koopmans et al. |
| 7,655,142 | B2 | 2/2010 | Liu et al. |
| 7,728,888 | B2 | 6/2010 | Ono |
| 7,763,173 | B1 | 7/2010 | Koopmans et al. |
| 8,323,498 | B2 | 12/2012 | Jenkins et al. |
| 8,505,881 | B2 | 8/2013 | Locklair et al. |
| 8,702,070 | B2 | 4/2014 | Locklair et al. |
| 2003/0006512 | A1 | 1/2003 | Kelly |
| 2003/0071377 | A1 | 4/2003 | Tharp |
| 2005/0279704 | A1 * | 12/2005 | Miklos ................. C02F 3/006 210/605 |
| 2006/0131232 | A1 * | 6/2006 | Rosen et al. ................ 210/614 |
| 2006/0163156 | A1 | 7/2006 | Eto |
| 2006/0254977 | A1 | 11/2006 | Koopmans et al. |
| 2006/0254979 | A1 | 11/2006 | Koopmans et al. |
| 2006/0254980 | A1 | 11/2006 | Koopmans et al. |
| 2007/0007214 | A1 | 1/2007 | Zha et al. |
| 2007/0108125 | A1 * | 5/2007 | Cho et al. .................. 210/605 |
| 2008/0296229 | A1 * | 12/2008 | Yamasaki et al. ......... 210/669 |
| 2010/0047424 | A1 * | 2/2010 | Cousin .................. A23G 9/06 426/524 |
| 2010/0163484 | A1 | 7/2010 | Cormier et al. |
| 2010/0187173 | A1 | 7/2010 | Lee et al. |
| 2013/0003486 | A1 | 1/2013 | Jenkins et al. |
| 2014/0183129 | A1 | 7/2014 | Locklair et al. |

FOREIGN PATENT DOCUMENTS

| | | | |
|---|---|---|---|
| JP | 64-70198 | * | 3/1989 |
| WO | 0021890 | A1 | 4/2000 |
| WO | 2007008630 | A2 | 1/2007 |
| WO | 2007038443 | A2 | 4/2007 |
| WO | 2008046139 | A1 | 4/2008 |
| WO | 2011046929 | A2 | 4/2011 |

OTHER PUBLICATIONS

EPA (U.S. Environmental Protection Agency), Office of Wastewater Management. "Evaluation of Energy Conservation; Measures for Wastewater Treatment Facilities," EPA 632-R-10-005. Sep. 2010.

EPA, Environmental Protection Agency, "Wastewater Management Fact Sheet, Membrane Bioreactors," Sep. 2007.

Kippax, Victoria, "Importance of Air Scour in Membrane Bioreactor Systems," www.waterworld.com/index/display/article-display/3887904678/art- icles/membranes . . . (submission copy printed from Internet Apr. 18, 2012).

PCT International Search Report and Written Opinion of the International Searching Authority for PCT Patent Application No. PCT/US2011/054809 mailed Jan. 5, 2012.

PCT International Search Report for PCT Patent Application No. PCT/US2010/052317 mailed May 11, 2011.

PCT International Search Report and Written Opinion for International Application No. PCT/US2010/052317 filed Dec. 10, 2010.

Phi Pulsed Hydraulics, Inc, Brochure, "Low Cost, Low Energy, Effective and Efficient Mixing," 008 Rev Sep. 2010, (2010).

Wallis-Lage et al., Energy Efficient MBR Designs Can Significantly Reduce Operating Costs, Water Environment Federation, WEFTC 2010, pp. 5828-5838.

WE&T, "Using a phased nitrification and identification mode has enable the Bozeman, Mont., wastewater treatment plant to reduce . . ." WE&T www.wef.org/Magazine, Jul. 2010.

WERF, "BASF Donates Nitrogen Removal Patent to WERF" (undated).

www.waterindustry.org/New%20Projects/zenon-sues-2.htm, "Zenon Files Suite Against US Filter Corporation," search date Mar. 2, 2011.

*Zenon Environmental, Inc.* v. *United States Filter Corporation*, "Order Constructing Claims for U.S. Pat. No. 6,245,239," filed Nov. 9, 2004 in US District of California, Civil Action Case No. 03CV1996-B(AJB).

*Zenon Environmental, Inc.* v. *United States Filter Corporation*, "Order Granting in Part and Denying in Part United States Filter Corporation's Motion for Summary Judgment for Non-Infringement of the Asserted Claim of U.S. Pat. No. 6,620,319," filed Nov. 16, 2005 in US District Court, Southern District of California, Civil Action Case No. 03CV1996-B(AJB).

*Zenon Environmental, Inc.* v. *United States Filter Corporation*, "Order Granting Motion for Summary Judgment for NonInfringement of Claim 20 of U.S. Pat. No. 6,550,747" filed Feb. 24, 2005 in US District Court, Southern District of California, Civil Action Case No. 03CV1996-B(JFS).

*Zenon Environmental, Inc.* v. *United States Filter Corporation*, "Stipulation and Order thereon for Dismissal without Prejudice of Certain Claims Relating to U.S. Pat. No. 6,245,239 and U.S. Pat. No. 6,550,747," filed Nov. 2, 2005 in US District Court, Southern District of California, Civil Action Case No. 03CV1996-B(AJB).

*Zenon Environmental, Inc.* v. *United States Filter Corporation*, now known as Water Applications & Systems Corporation, "Order Denying Defendant United States Filter Corporation's Motion for Summary Judgment of Invalidity and Non-Infringement of Asserted Claims 1-3 of U.S. Pat. No. 6,245,239," filed Mar. 14, 2005 in US District Court, Southern District of California, Civil Action Case No. 03CV1996-B(AJB).

*Zenon Environmental, Inc.* v. *United States Filter Corporation*, now known as Water Applications & Systems Corporation, "Order Denying Defendant United States Filter Corporation's Motion for Summary Judgment of Invalidity of Asserted Claim 7 of U.S. Pat. No. 6,620,319," filed Mar. 14, 2005 in US District Court, Southern District of California, Civil Action Case No. 03CV1996-B(AJB).

*Zenon Environmental, Inc.*, Plaintiff-Cross Appellant v. *United States Filter Corporation* (now known as Water Applications & Systems Corporation), Defendant-Appellant, Opinion decided Nov. 7, 2007 in US Court of Appeals for the Federal Circuit2006-1266, -1267, Civil Action Case No. 03CV1996-B(AJB).

Zhang et al., "Simultaneous nitrification and denitrification in activated sludge system under low oxygen concentration," Front. Environ. Sci. Engin. China, 2007, 1(1):49-52.

U.S. Office Action dated Aug. 24, 2012 issued in U.S. Appl. No. 12/577,529.

Response filed Jan. 24, 2013 to U.S. Office Action dated Aug. 24, 2012 issued in U.S Appl. No. 12/577,529.

U.S. Office Action dated Jun. 26, 2012 issued in U.S. Appl. No. 13/252,905.

Response filed Sep. 26, 2012 to U.S. Office Action dated Jun. 26, 2012 issued in U.S. Appl. No. 13/252,905.

U.S. Office Action dated Nov. 8, 2012 issued in U.S. Appl. No. 13/591,495.

Response filed May 8, 2013 to U.S. Office Action dated Nov. 8, 2012 issued in U.S. Appl. No. 13/591,495.

(56) References Cited

OTHER PUBLICATIONS

U.S. Office Action dated May 17, 2013 issued in U.S. Appl. No. 13/591,495.
Response filed Nov. 8, 2013 to U.S. Office Action dated May 17, 2013 issued in U.S. Appl. No. 13/591,495.
U.S. Office Action dated Dec. 18, 2012 issued in U.S. Appl. No. 13/591,509.
Response filed Jun. 18, 2013 to U.S. Office Action dated Dec. 18, 2012 issued in U.S. Appl. No. 13/591,509.
U.S. Office Action dated Jul. 3, 2013 issued in U.S. Appl. No. 13/591,509.
U.S. Office Action dated Sep. 28, 2015 issued in U.S. Appl. No. 14/198,346.

* cited by examiner

SYSTEMS AND METHODS FOR AUTOMATED CONTROL OF MIXING AERATION IN TREATMENT PROCESSES

CROSS-REFERENCE TO RELATED APPLICATIONS

This application is a Continuation of U.S. patent application Ser. No. 13/591,509 filed on Aug. 22, 2012, now abandoned, which is a continuation of U.S. patent application Ser. No. 13/252,905 filed on Oct. 4, 2011, which was published as U.S. Published Patent Application No. 2012-0085704 and was issued as U.S. Pat. No. 8,323,498, of which claims priority to U.S. Provisional Patent Application Ser. No. 61/389,645, filed on Oct. 4, 2010, the contents of which are incorporated herein in their entireties.

FIELD OF THE INVENTION

The present invention relates to control systems, particularly systems and methods for automatically controlling mixing and aeration processes, such as in wastewater treatment.

BACKGROUND

Methods and systems for treating wastewater are known in the art. Such methods may include aerobic, anoxic, and anaerobic processes.

SUMMARY OF THE INVENTION

The present invention includes a system for automatically controlling an treatment process based upon at least one or more dynamically measured parameters including a probe for measuring at least one parameter of a substance, a control panel in communication with the probe wherein the control panel receives data from the probe representing the measurement of the at least one parameter, a programmable logic controller in communication with the control panel, and an aerator in communication with the control panel. The system is configured to activate the aerator upon measurement of a first parameter characteristic of a dynamically-measured parameter and to deactivate the aerator upon measurement of a second parameter characteristic of a dynamically-measured parameter.

The present invention further includes a method for controlling the aeration of a substance based upon dynamically-measured data. The method includes measuring at least one parameter of the substance, activating aeration of the substance upon measurement of a first characteristic of the at least one parameter, and deactivating aeration of the substance upon measurement of a second characteristic of the at least one parameter.

The present invention further includes a method for controlling the aeration of a substance based upon dynamically-measured data. The method dynamically measuring and monitoring an ORP value, nitrate concentration, and ammonia concentration of wastewater. The method also includes activating aeration of the wastewater upon the detection of either an ORP nitrate knee, a minimum ORP threshold value, or a maximum ammonia threshold concentration and deactivating aeration of the wastewater upon the detection of either a maximum nitrate threshold concentration or a maximum ORP value.

In addition, the present invention includes a method for the simultaneous nitrification and denitrification of wastewater. The method includes dynamically measuring and monitoring a dissolved oxygen concentration, a nitrate concentration, and an ammonia concentration of the wastewater, aerating the wastewater, adjusting the aeration such that the dissolved oxygen concentration is maintained in a range from about 0.25 mg/L to about 1.0 mg/L, the nitrate concentration is maintained in a range from about 0 mg/L to about 30 mg/L, and the ammonia concentration is maintained in a range from about 0 mg/L to about 30 mg/L. The method further includes mixing the wastewater.

The present invention may be better understood by reference to the description and figures that follow. It is to be understood that the invention is not limited in its application to the specific details as set forth in the following description and figures. The invention is capable of other embodiments and of being practiced or carried out in various ways.

BRIEF DESCRIPTION OF THE DRAWINGS

These and other features, aspects, and advantages of the present invention are better understood when the following detailed description is read with reference to the accompanying drawings, wherein.

Figure 1:
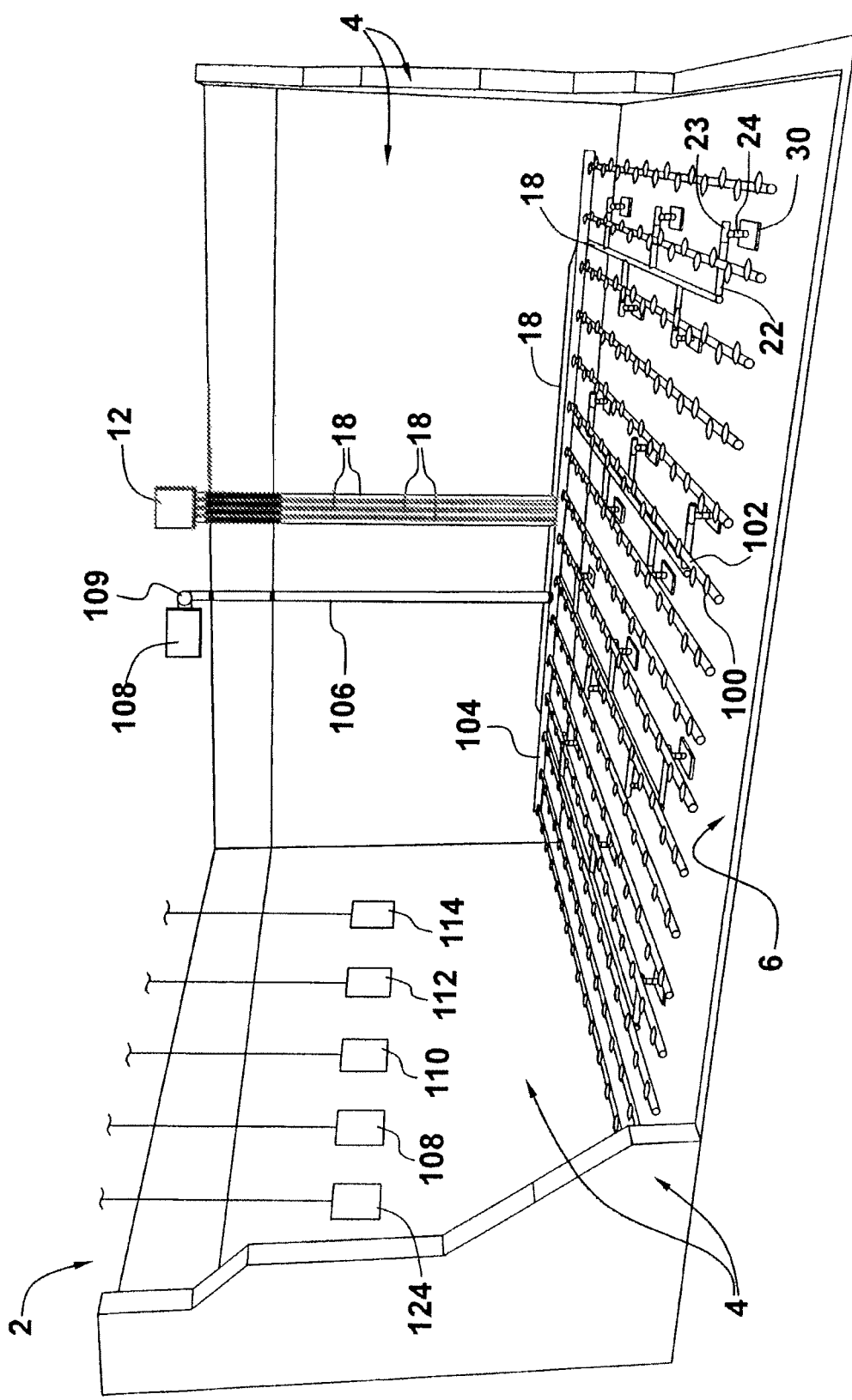
FIG. 1 is a side cut-away view of a basin with aeration and mixing components for use in conjunction with an embodiment of the present invention.

Repeat use of reference characters in the present specification and drawings is intended to represent same or analogous features or elements of the invention.

DETAILED DESCRIPTION OF EXEMPLARY EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Reference will now be made in detail to various embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various processes often require multiple phases, and it may be advantageous to monitor the parameters during such processes and automatically change operating conditions based upon observed parameters of the process. By way of example, the treatment of wastewater may involve various treatment phases, such as aerobic, anaerobic, and anoxic treatment phases, and it may be useful to measure parameters of the wastewater and to automatically initiate changes between treatment phases based upon the measured parameters, which may indicate the treatment requirements of the wastewater.

FIG. 1 provides a cut-away side view of basin 2, which is one embodiment of a containment unit for wastewater that can be used with the present invention. Basin 2 is shown with four sidewalls 4 and bottom 6, which may be constructed of concrete in some embodiments. One of ordinary skill in the art will appreciate that alternative types of containment units, such as tanks, vessels, channels, and ditches, are also within the scope of the present invention. The containment unit may additionally have an inlet through which wastewater enters and an outlet through which the treated wastewater exits. In some embodiments, the containment unit may allow for continuous flow of the wastewater whereas other embodiments may restrict the flow of the wastewater. In some embodiments, multiple containment units, of the same type or of differing types, may be present and connected such that the wastewater passes through them sequentially or not connected such that wastewater passes thru them in parallel.

As shown in FIG. 1, a mixing system for use with basin 2 includes controller box 12, supply headers 18, first lines 22, second lines 22, and nozzles 30, wherein each first line 22 is connected to a second line 22 by way of a T-type connector 23. The operation of the mixing system and additional components thereof are described in detail in U.S. patent application Ser. No. 12/577,529, which is incorporated herein in its entirety by reference thereto. It will be readily apparent to one of ordinary skill in the art that alternative mixing systems, such as mechanical mixers, submersible mixers, surface mixers, agitators, static mixers, and hyperbolic mixers, can be used with basin 2 or any containment unit for wastewater and are within the scope of the present invention. Similarly, the number of mixing components and layout of the mixing components may vary within the scope of the present invention. In addition, the number and arrangement of mixing components may vary in other embodiments of the present invention.

Basin 2 is also equipped with an aeration system. As shown in FIG. 1, an embodiment of an aeration system includes diffuser heads 100 as the aerators, and each diffuser head 100 is serially connected to diffuser pipe 102. Each depicted diffuser pipe 102 is then connected with header pipe 104, and header pipe 104 is connected with supply pipe 106. Supply pipe 106 is connected to blower 108, which delivers air under pressure to each diffuser head 100 by way of supply pipe 106, header 104, and diffuser pipe 102. Valve 109 is connected with blower 108 to control the flow of air to supply pipe 106. In some embodiments, diffuser heads 100 may be located in proximity to bottom 6 but are not flush with bottom 6. In addition, diffuser pipe 102 may be secured to bottom 6 or located above bottom 6 and supply pipe 106 may be secured to a side 4 of basin 2.

The depicted aeration system and components thereof are illustrative only, and it will be readily apparent to one of ordinary skill in the art that alternative types of aeration systems, aerators, and aeration components are within the scope of the present invention. By way of example, alternative aerators for use in embodiments of the present invention may include fine bubble (or fine pore) diffusers or course bubble diffusers, mechanical aerators, centrifugal blowers, jet aerators, and positive displacement blowers. In addition, the layout and number of aeration devices may vary in alternative embodiments of the present invention. For instance, in some embodiments, the number or arrangement of diffuser heads 100 may vary.

Probes for measuring various parameters may also be located within basin 2. Some probes may directly detect a certain parameter or certain parameters whereas other probes may detect or measure a parameter or parameters that can then be used to compute a desired parameter, either alone or in combination with other data. As used herein, the term "measured" includes detected parameters, directly-measured values of parameters, and parameter values calculated or otherwise determined from the direct measurement or detection of one or more other parameters, either alone or in combination with additional data or measurements.

As shown in basin 2, such probes may include Oxygen-Reduction Potential (ORP) probe 108, nitrate ($NO_3$—N) probe 110, ammonia ($NH_3$—N) probe 112, dissolved oxygen (DO) probe 114, and pH probe 124. In some embodiments, a probe may actually measure ammonium concentrations in order to determine ammonia concentrations. In other embodiments, additional probes for measuring other parameters such as nitrite and/or temperature may be present, and in other embodiments some or all of the depicted probes may be omitted. In yet other embodiments, multiple probes for measuring a single parameter may be present, such as two or more DO probes 114. In some embodiments, a system may include multiple basins. In those embodiments, probes may be located in each basin or, alternatively, probes may be placed in a single basin and the measurements from those probes may be used to control the processes in each basin. In an even further embodiment, each basin may include one or more DO probes such that the DO level can be controlled independently for each basin, but the remaining processes may be monitored and controlled for all basins by using probes in a single basin. In some embodiments of the present invention, the probes may measure the desired parameters without any need for sampling the substance. In this manner, in some embodiments, the probes may be in direct and constant contact with the substance for which parameters are being measured.

Figure 2:
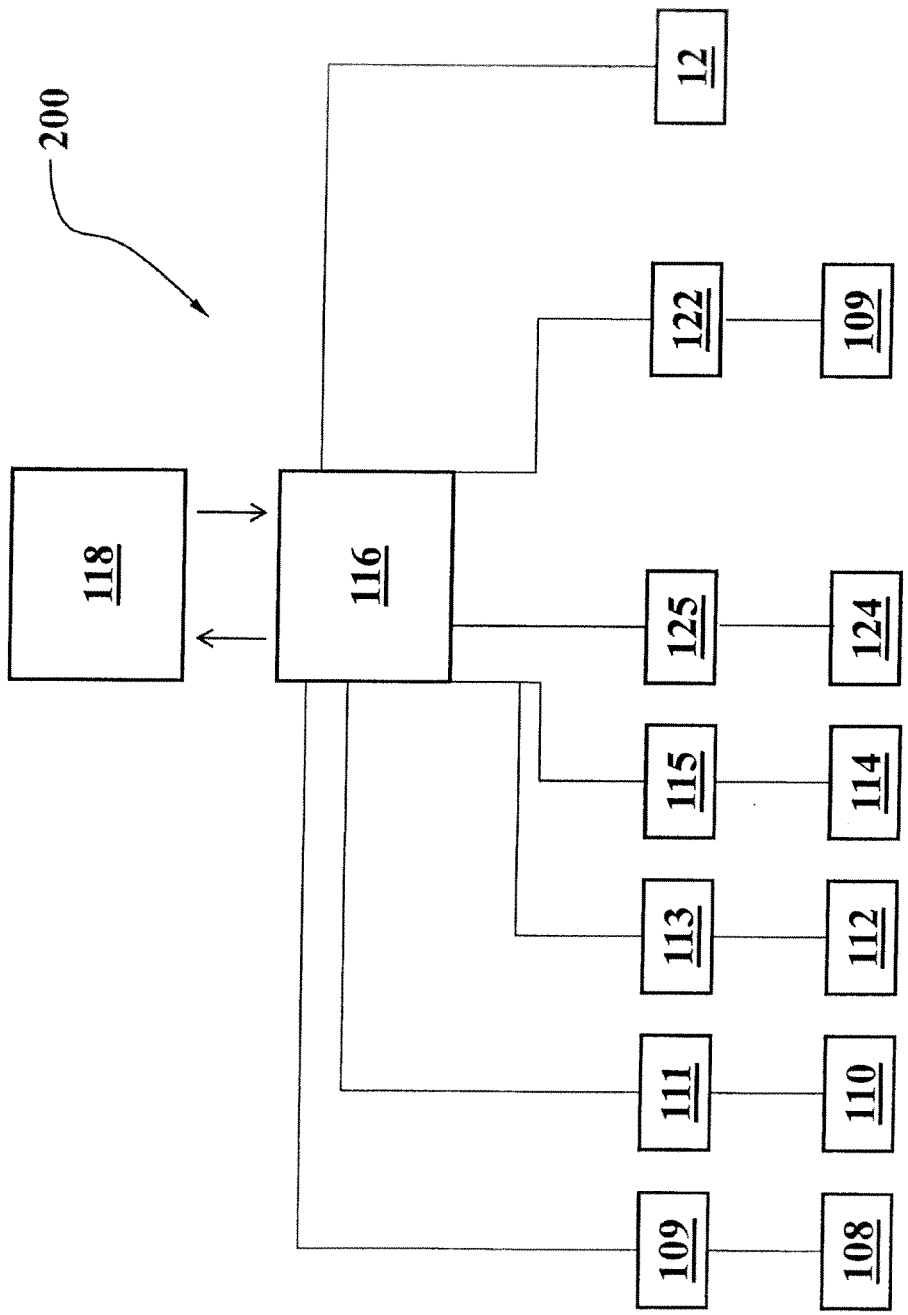
FIG. 2 is a schematic diagram of a system that depicts an embodiment of the present invention.

FIG. 2 depicts system 200, which is one embodiment of a system of the present invention. As shown in system 200, ORP probe 108 is in communication with ORP probe processor 109, nitrate probe 110 is in communication with nitrate probe processor 111, ammonia probe 112 is in communication with ammonia probe processor 113, DO probe 114 is in communication with DO probe processor 115, and pH probe 124 is in communication with pH probe processor 125. Probe processors may be supplied with a probe from the probe manufacturer. As used herein, the reference "in communication with" indicates that data and/or signals are transferable between the referenced components, and include both physical connections and wireless connections. In addition, "in communication with" also includes embodiments in which the referenced components are in direct connection (i.e., directly connected to each other with a cable) as well as indirect connections, such as when data is transmitted through an intermediate component and either relayed in the same format or converted and then relayed to the referenced component. In other embodiments, some or all of ORP probe 108, nitrate probe 110, ammonia probe 112, DO probe 114, and pH probe 124 may be in communication with a single probe processor.

As shown in system 200, a programmable logic controller (PLC) 116 is in communication with and receives input from ORP probe processor 109, nitrate probe processor 111, ammonia probe processor 113, DO probe processor 115, and pH probe processor 125. PLC 116 is also in communication with control panel 118. Control panel 118 may contain a PC, a PLC, a device to aid the communication between the PC and PLC, and other wiring and miscellaneous hardware. In some embodiments, PLC 116 and control panel 118 may be combined within a single device. For instance, in some embodiments, control panel 118 may include a PLC and a separate PLC 116 may not be required. In other embodiments, more than one PLC 116 may be present. In other alternative embodiments, a probe processor may be omitted for some or all probes and probes may be in direct communication with PLC 116 without a probe processor.

In some embodiments, basin 2 may contain wastewater requiring treatment. Influent wastewater often contains ammonia ($NH_3$—N) or other organic waste that includes nitrogen. In many wastewater treatment processes, an aerobic process is used to treat the waste using dissolved oxygen along with bacteria to convert the ammonia to nitrate ($NO_3$—N), a process that may be referenced as nitrification. After the ammonia has been converted to nitrate, an anoxic process is often performed to convert the nitrate to nitrogen gas, called denitrification. During this anoxic process, dissolved oxygen is not provided to the wastewater undergoing treatment and the bacteria rely upon oxygen from the nitrate, which results in the nitrate to nitrogen gas conversion. Therefore, it may be desirable to automatically convert between the aerobic and anoxic treatment processes by controlling the flow of oxygen or other gas to the wastewater. In addition, it may be beneficial to convert between those treatment processes based upon the levels of certain parameters in the wastewater.

In operation, control pane 118 and PLC 116 may control the flow of air to diffuser heads 100 based upon parameters dynamically measured from the wastewater using one or more of ORP probe 108, nitrate probe 110, ammonia probe 112, DO probe 114, pH probe 124, or other parameter-specific probes. For instance, with reference to FIG. 2, in some embodiments, control panel 118 and PLC 116 may activate and deactivate the flow of air to diffuser heads 100, thereby controlling the aeration of the contents of basin 2. In other embodiments, control panel 118 and PLC 116 may also control the rate of air flow to diffuser heads 100 to control the aerobic phase. As explained further herein, this system and process allow for automated control between aerobic and anoxic wastewater treatment processes based upon dynamically-measured parameters of the wastewater. In other embodiments, in addition to aeration control, control panel 118 may control the activation and deactivation of the mixing system as well as the speed or mixing rate. The entire operation of system 200 is described in detail below.

In operation, with reference to FIG. 2, Oxygen-Reduction Potential (ORP) probe 108, nitrate ($NO_3$—N) probe 110, ammonia ($NH_3$—N) probe 112, dissolved oxygen (DO) probe 114, and pH probe 124 dynamically measure the parameter of the respective probe and transmit the measurements to ORP probe processor 109, nitrate probe processor 111, ammonia probe processor 113, DO probe processor 115, and pH probe processor 125 respectively. That information is then transmitted from the respective probe processors to PLC 116, and PLC 116 then converts the data and transmits the converted information to control panel 118.

Figure 3:
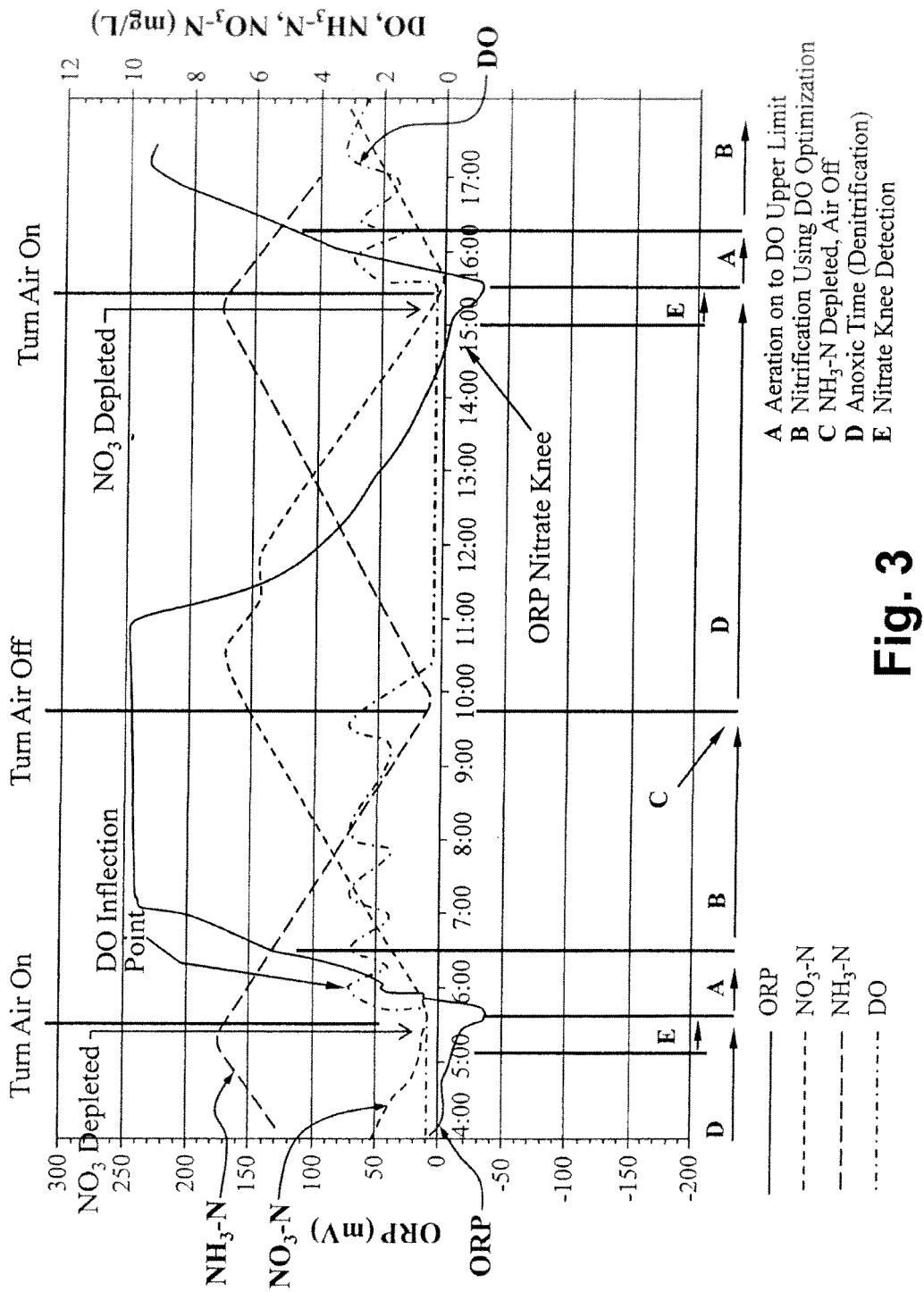
FIG. 3 is a graphical representation of the operation of an embodiment of a system of the present invention based upon measured wastewater parameters.

FIG. 3 provides a graphical illustration of measured parameters that are transmitted to control panel 118 over a time period. At the beginning of the depicted time period, the wastewater system is in the latter stages of an anoxic treatment in which the aerators are not activated and the dissolved oxygen levels are at or near zero. By monitoring the measured parameters of the wastewater undergoing treatment, system 200 can control when to activate air flow to diffuser heads 100, thereby ending the anoxic treatment process and beginning the aerobic treatment process, such as when the nitrate in the wastewater is depleted.

By way of example, one manner of detecting when to end the anoxic treatment process and begin the aerobic treatment process by activating the flow of air to the aerators, such as diffuser heads 100, is by monitoring the measured ORP level. ORP is a value that represents the ratio of oxidants to reductants in the subject system, such as the wastewater in the illustrative embodiment. Because the ratio is represented as oxidants to reductants, the ORP value decreases as oxygen is removed from the system in the anoxic process and as nitrate is converted to nitrogen gas. During anoxic treatment processes, characteristic indications in the ORP values may be observed. For instance, one such characteristic value is the ORP nitrate knee, which is shown at the beginning of range E in FIG. 3. The ORP nitrate knee is not detected as a specific value but instead as a slope change indicating this characteristic point as a first order derivation. The ORP nitrate knee indicates that the system is nearing conversion to an anaerobic state, and the ORP nitrate knee may further indicate that the nitrate level in the system is nearing depletion as shown in FIG. 3. If the system is allowed to become anaerobic, then difficulties may be encountered in returning the system to an aerobic or anoxic state with the necessary healthy bacteria.

In one embodiment, the ORP nitrate knee may be determined by performing least squares linear regression on data points of two series. A first data series may include data from recently measured data points over a first time period, and a second data series may include data measured over a time period preceding the first time period. The least squares linear regression calculation of the first data series is then subtracted from the least squares linear regression calculation of the second data series and if the difference exceeds a predetermined value, then the ORP nitrate knee is detected. As the calculation is progressively run, the measured data points are continually or periodically measured for the calculation. One illustrative embodiment of detecting the ORP nitrate knee is set forth in the computer program listing appendix hereto, which was incorporated herein by reference above.

Upon detection of the ORP nitrate knee by control panel 118, control panel 118 sends signals to PLC controller 116 and, as a result, PLC sends signals to valve actuator 120, which controls valve 109. As a result, valve 109 is actuated and permits blower 108 to provide air to diffuser heads 100 by way of supply pipe 106, header pipe 104, and diffuser pipe 102. Other types of aeration equipment may be started by a different method, such as an electric starter, activated by the PLC signal. As a result, oxygen is provided to the wastewater undergoing treatment and an aerobic treatment process is commenced. Therefore, as shown on FIG. 3, the air is turned on at the beginning of range A as a result of monitoring the ORP measurements and, particularly, by the ORP nitrate knee serving as the trigger for activation of the aerobic treatment process. Although the ORP nitrate knee is detected at the beginning of range E in FIG. 3, the delay in activating the air flow to the wastewater until the end of range E is a result of the lag in detecting the ORP nitrate knee, processing the data, and activating the components. The lag time represented by range E can vary in different systems, but because the ORP nitrate knee indicates that the system is nearing conversion to an anaerobic state, it may be beneficial to limit the duration of the lag time represented by range E. Given the history of data that may be stored in the control panel over time and at similar points in the cycle, the point of change can be anticipated by the system enabling more precise control.

In this regard, using the ORP nitrate knee as a trigger for commencing the aerobic treatment process may be useful because it permits lag time before the system becomes anaerobic. In addition, ORP measurements indicate relative values and do not have a minimum value of zero. Therefore, as opposed to using other values as an indication for activating a treatment process, such as concentration levels of components for which precision may be decreased as the concentration levels decrease, ORP levels can be constantly measured with precision. In addition, ORP probes may be more reliable for use in certain embodiments than other types of probes.

In alternative embodiments of the present invention, other parameters can be monitored, either in addition to the ORP nitrate knee or instead of the ORP nitrate knee, to activate an aeration treatment process. For instance, in one embodiment, the nitrate value itself can be used as a trigger to activate the aerobic treatment process and the flow of air may be commenced as described above when the nitrate level is depleted or near depletion. In other embodiments, the nitrate level may serve as a secondary (or back-up) value for activating the aerators. For instance, if the nitrate level of wastewater approaches zero before the ORP nitrate knee were detected, then the aerators may be activated. In some embodiments, having one or more secondary values for triggering responses is desirable because it will maintain the proper system functionality in the event that a probe for another parameter is damaged or malfunctioning. In yet another embodiment, a maximum ammonia level may be used as a trigger to initiate the aerobic treatment process, such as an ammonia level of about 7.0 mg/L could be used in FIG. 3 as such a trigger. In yet another embodiment, the ORP value falling below a set level, such as below −50, may be a trigger to initiate the aerobic treatment process. In a further embodiment, the pH measurement can be used as a trigger to initiate the aerobic process. For instance, a plateau in the pH measurements may occur when dentrificaiton is complete or nearly complete. Upon detection of such a pH plateau, some embodiments may trigger aeration. In addition, in other embodiments values of pH may be used to activate, deactivate, or control aeration or aeration rate. Regardless of the parameter or parameters used, control panel 118 and PLC 116 operate to activate the aeration as described above upon the triggering parameter's detection.

In addition to activating the flow of oxygen to the wastewater to commence an aerobic treatment process as explained above, embodiments of the present invention may also be used to regulate treatment parameters based upon dynamic measurements of the parameters. For instance, in some embodiments, it may be desirable to maintain the DO level in the wastewater at or within a certain level during an aerobic treatment processes and exceeding that level may not be beneficial. Therefore, in some embodiments, the flow of oxygen to the wastewater may be activated or controlled in order to maintain the DO concentration at the desired and optimal level.

By way of example, in some embodiments, the desired DO level during an aerobic treatment process may be 2.0 mg/L, and the flow of oxygen may be continually turned off and on or the oxygen flow rate increased or reduced to maintain the DO level at this value during the aerobic treatment process. Although in some embodiments the flow of oxygen is controlled, other embodiments may control the flow of other gases, such as atmospheric air. For instance, at the beginning of the aerobic treatment process shown in FIG. 3 the flow of oxygen to the wastewater is provided at a maximum low rate during range A. This initial provision of oxygen serves to quickly raise the DO level in the system. However, as indicated, it may not be beneficial to exceed a threshold DO level, such as 2.0 mg/L. Therefore, control panel 118 may transmit signals to control the flow of air to the wastewater through the aerators based upon real-time, dynamic measurements of the DO level as measured by DO probe 114. In response to the DO level nearing or exceeding a threshold level, control panel 118 may send a signal to PLC 116, and PLC 116 may signal valve actuator 122 to restrict or stop the oxygen flow to diffuser heads 100. After oxygen flow is reduced or terminated and the DO level depletes near or below the optimal level, then control panel 118, via the same mechanism, may reactivate or increase the oxygen flow to maintain or return the DO level to the threshold level. In other embodiments, other DO concentration levels may be desirable. By way of example, a DO level within the range within the range of 0.5 to 2.0 mg/L may be desirable in some embodiments. In other embodiments, the desirable range may be 0.25 to 0.75 mg/L, 1.0 to 1.5 mg/L, or 0.25 to 2.0 mg/L. In some embodiments, the oxygen flow may be controlled using historical data of valve position for a given DO concentration.

In some embodiments, such as mechanical aerators or blowers without variable speed drives that can only be turned on or off and the oxygen flow not regulated, control panel 118 may signal to deactivate less than all of a plurality of devices used to compress atmospheric air for purposes of oxygenation, such as, without limitation, positive displacement blowers, centrifugal blowers, or rotary disc surface aerators, in order to decrease the overall oxygen flow to the wastewater without regulating the specific output of each blower. As a result of such optimization levels as well as consumption of oxygen by bacteria, the DO level during the aerobic treatment process show in FIG. 3 is not constant but fluctuates around 2.0 mg/L, as referenced as the DO Optimization in range B. In other embodiments, the system may maintain a more constant DO level at or near a desired threshold during aerobic treatment processes.

In other embodiments, the oxygen requirements fluctuate based upon the ammonia level in the system with which the oxygen reacts. In such embodiments, the flow of air to the wastewater may be controlled as set forth above based upon the measured ammonia level, wherein oxygen flow is increased for high ammonia levels and decreased for lower ammonia levels. For other measurable wastewater parameters such as TSS, COD or BOD, the flow of air to the wastewater may also be controlled.

As explained above, oxygen (as used in the following example) or other gas, such as atmospheric air, is provided through diffuser heads 100 during range A and range B in FIG. 3 as the aerobic treatment process is underway. Similar to the termination of the anoxic treatment process described above, parameters of the wastewater may be dynamically measured and monitored during the aerobic treatment process so that the process can be automatically terminated. In one embodiment of the present invention, one trigger for terminating oxygen flow to the wastewater may be the measured nitrate level. For instance, as shown in FIG. 3, the aerators are deactivated when the nitrate level reaches a set concentration, such as 6 mg/L and, upon such termination, another anoxic treatment process is commenced to reduce the nitrate Level that has risen during the aerobic treatment process. In other embodiments, an alternative nitrate threshold may be used depending upon a particular system's requirements and operations, such as a threshold within the range of about 2.0 to 15.0 mg/L, including a threshold in alternative embodiments, for instance, such as 2 mg/L, 3 mg/L, 4 mg/L 5 mg/L, 6 mg/L, 7 mg/L, 8 mg/L, 9 mg/L, 10 mg/L, 11 mg/L, 12 mg/L, 13 mg/L, 14 mg/L, or 15 mg/L. In other embodiments, the threshold may be within a range of about 2.0 to 6.0 mg/L, including a threshold of about 2 mg/L, 3 mg/L, 4 mg/L, 5 mg/L, 6 mg/L, or 7 mg/L. As indicated in FIG. 3, the measured nitrate level may experience a more gradual variation during the treatment processes than other parameters, thereby making it a useful parameter to trigger deactivation of the oxygen flow. Upon detection of a triggering parameter, such as the nitrate level reaching a threshold, control panel 118 sends a signal to PLC 116, and PLC signals valve actuator 122 to stop close valve 109 to stop the oxygen flow, thereby ending the aerobic treatment process and commencing an aerobic treatment process.

In an alternative embodiment, the DO level may be used as a trigger, either as a primary or secondary trigger, for terminating the aerobic treatment process. For instance, if the measured DO level is maintained over a certain level for a preset duration, thereby indicating that the oxygen is not being utilized to convert ammonia to nitrate, then the oxygen flow may be deactivated. In other embodiments, the ORP value can be utilized as a trigger for deactivating the aerators. In some embodiments, the aerators may be deactivated when the ORP value reaches 150. Similarly, if an ORP value remains within a certain range for a predetermined duration, then some embodiments may terminate aeration.

Similarly, the measured ammonia level may be used as a trigger for terminating the aerobic treatment process. For instance, as shown in FIG. 3 at point C, the measured ammonia level is nearly depleted (having been converted to nitrate as indicated by the increased nitrate concentration at point C). Because the ammonia level is nearly depleted, an embodiment using this parameter as a trigger would stop the flow of oxygen, thereby activating another anoxic cycle. If an embodiment uses the ammonia level as a trigger for terminating the aerobic treatment process, then a threshold can be set, such as absolute ammonia depletion or a range within absolute depletion, such as within 0.5 mg/L.

In other embodiments, other parameters may be used to terminate and initiate treatment processes, either in lieu of or in addition to the parameters discussed above. For instance, in one alternative embodiment, the pH value may be monitored and thresholds may be set for turning on the aeration process as described above and also for turning off the aeration process. For instance, a system that is fully nitrified may have a low pH that can be used as a trigger to end the anoxic process, such as about 6.2. Similarly, the wastewater pH will rise as the aerobic process is conducted and a maximum pH threshold can be set to end the aerobic treatment process, such as about 7.4. In other embodiments, a valley indicated in the pH measurements may indicate to terminate an aeration process. This pH valley is the opposite of a pH plateau that may be used to initiate aeration in some embodiments. In some embodiments in which additional parameters are measured, additional or alternative probes may be required than those disclosed in FIG. 1. In other embodiments, the measured level of suspended solids in the wastewater may be used to control the mixing or aeration of the wastewater.

Figure 4:
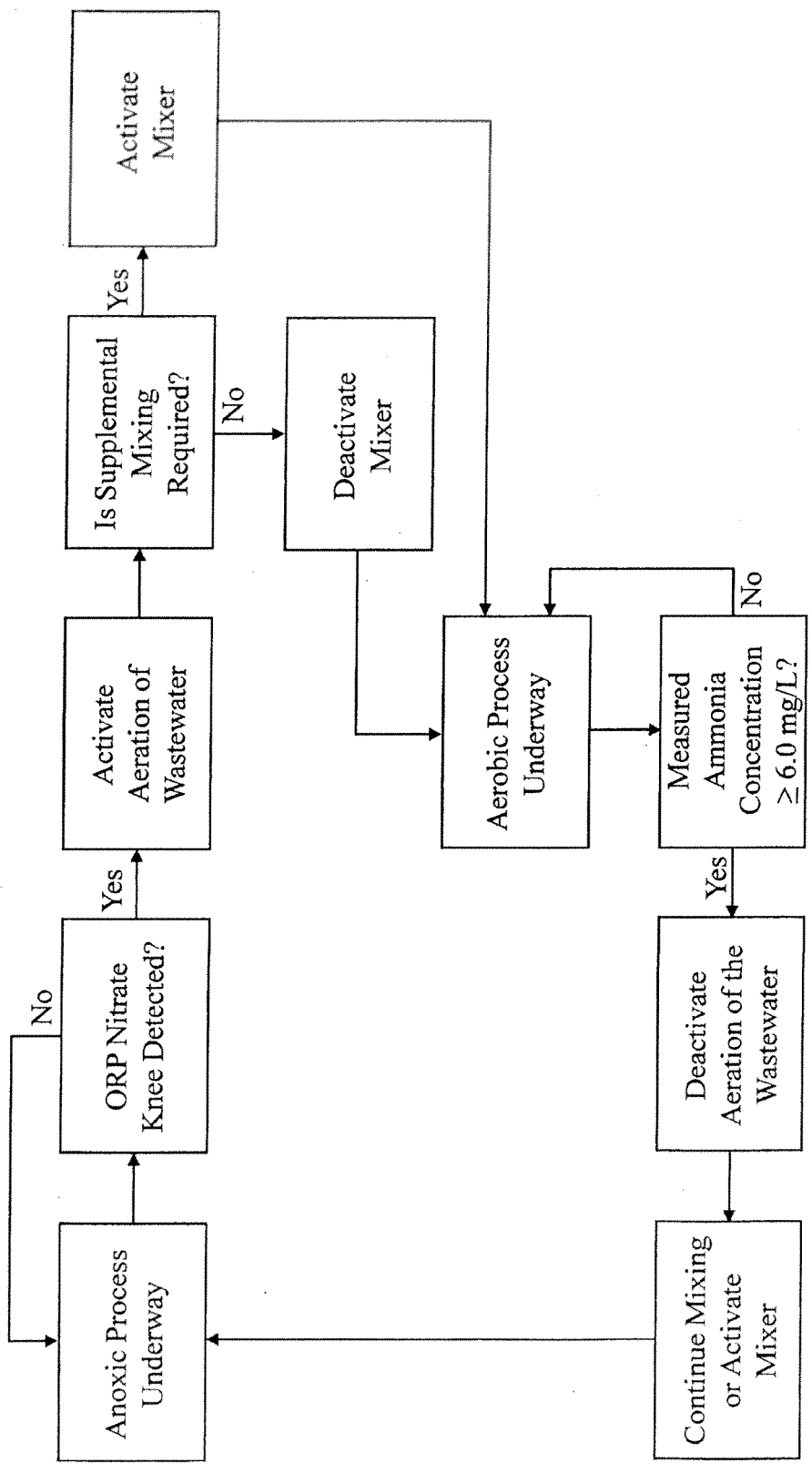
FIG. 4 is a flowchart that illustrates the logic of one embodiment of the present invention.
Figure 5:
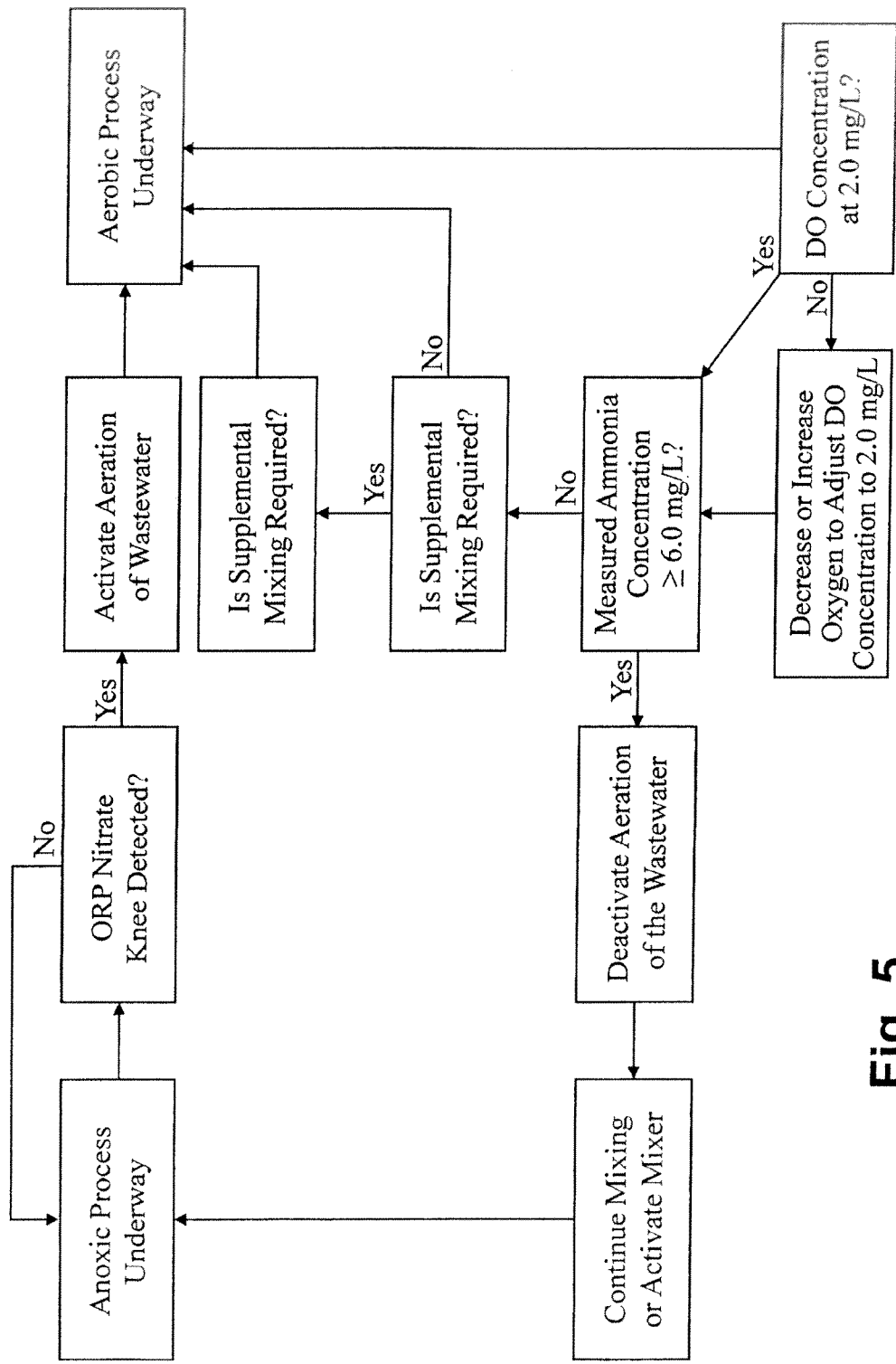
FIG. 5 is a flowchart that illustrates the logic of an alternative embodiment of the present invention.
Figure 6:
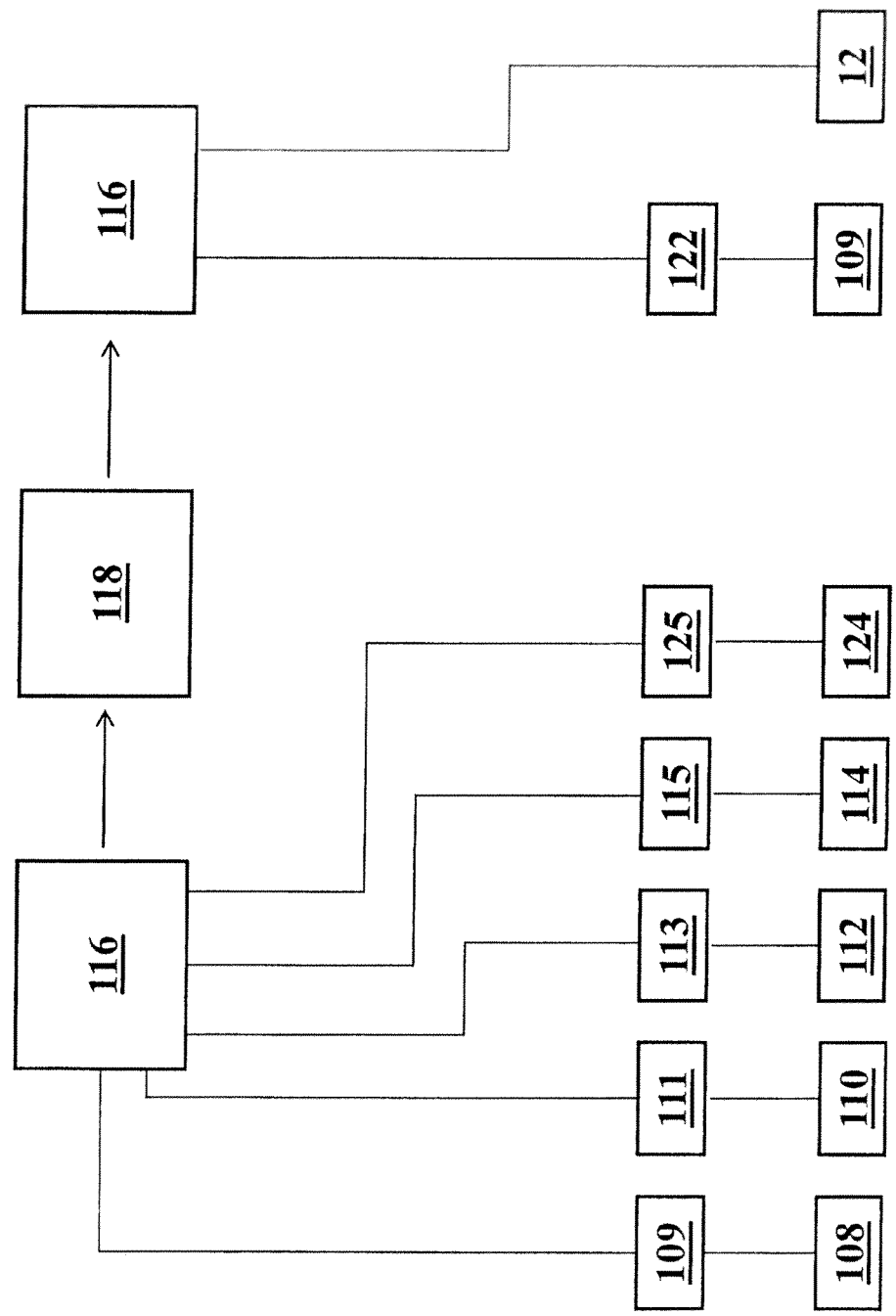
FIG. 6 is a schematic diagram of a system that depicts an alternative embodiment of the present invention.

In some embodiments of the present invention, activating or and/or deactivating the flow of oxygen to the wastewater may be based upon a combination of one or more parameters. For instance, in one embodiment, oxygen flow may be activated based upon a consideration of both the ORP nitrate knee and the measured nitrate level, wherein these respective values are both considered. In some embodiments, each factor could be assigned a significance value, such as the ORP value being a more controlling factor than the nitrate level but both factors figuring into the ultimate oxygen flow activation decision. FIGS. 4 and 5 illustrate the logic underlying example embodiments of the present invention, including the mixing function described in detail below. In addition, FIG. 6 illustrates an alternative embodiment that offers the same functionality but employs two PLCs 116. Other embodiments may employ other additional PLCs 116. In some embodiments, one or both PLCs depicted in FIG. 6 could be included within control panel 118. However, notably in some embodiments of the present invention, a measured parameter is determinative to commence and/or end the aerobic or anoxic treatment process and the measured parameter does not merely trigger the start of the running period of a set treatment time. Other embodiments may employ sets of probes with communications and PLCs dedicated to separate tanks in parallel operating at various points in the cycle to control each tank aeration or mixing simultaneously.

In some embodiments, as shown in FIG. 2, system 200 may also control the mixing system. For instance, in some treatment processes, it is unnecessary to continuously mix the wastewater, and mixing may only be conducted during an anoxic treatment process. Therefore, in some embodiments of the present invention, control panel 118 may indicate to activate or deactivate a mixing system as a function of whether aeration is occurring. In other embodiments, the necessity or rate of mixing may be determined by monitoring the air flow during aeration to determine if supplemental mixing may be required to ensure the desired treatment.

With reference to FIGS. 1 and 2, controller 118 can send a signal to PLC 116 indicating to activate or deactivate the mixing system, such as the flow of air to nozzle 30. In that instance, PLC 116 may transmit a signal to controller box 12, and controller box 12 would actuate control valves 14 based upon the signal to begin or end the mixing by controlling the supply of air to nozzle 30. In embodiments using other types of mixers, such as mechanical mixers, PLC 116 may transmit a signal to either supply or terminate power to the mixer.

In other embodiments of the present invention, multiple probes for a single parameter (such as multiple ORP probes 108, nitrate probes 110, ammonia probes 112, DO probes 114, and pH probes 124) may be displaced within a containment unit, such as basin 2. Controller 118 may monitor the differences between the measurements for a parameter at various displacements within basin 2 and activate or deactivate mixing based upon the concentration differentiation of a particular at various points of the wastewater undergoing treatment.

In alternative embodiments, control panel 118 can also transmit a signal to the mixing system to control the rate of mixing. For instance, in the embodiment depicted in FIG. 1, control panel 118 may send a signal to PLC 116, and PLC 116 may transmit a signal to controller box 12 to adjust the control valves, thereby controlling the mixing rate. The actuator may control the flow rate by permitting or obstructing the flow of air, or the rate of air flow, to supply lines 18. In other embodiments in which other types of mixers are used, such as mechanical mixers, control panel 118 and PLC 116 may transmit signals to control the speed of the mixer. In still other embodiments, control panel 118 and PLC 116 may send signals to deactivate some of a plurality of mixers, thereby decreasing the overall mixing rate.

In addition to measured parameters, time parameters may be used to control mixing or the flow of oxygen. For instance, a maximum period for an aerobic treatment process or an anoxic treatment process may be a parameter. In some embodiments, such time parameters could be determined by control panel 118 based upon historical operation of the system, historical parameter measurements of the wastewater, and/or operating conditions, such as flow rate of influent, weather conditions, and/or time of day. The time parameters could serve either as a primary trigger for starting and stopping the aerobic treatment process, either alone or in combination with other parameters, or alternatively as a secondary (back-up) parameter. In addition, in some embodiments, a flow meter may be connected to diffuser pipe 102, header pipe 104, or supply pipe 106 to measure the flow rate of oxygen, and the flow meter may be in communication with PLC 116 and provide the measured data to control panel 118 for processing or to control the valve 109.

Figure 7:
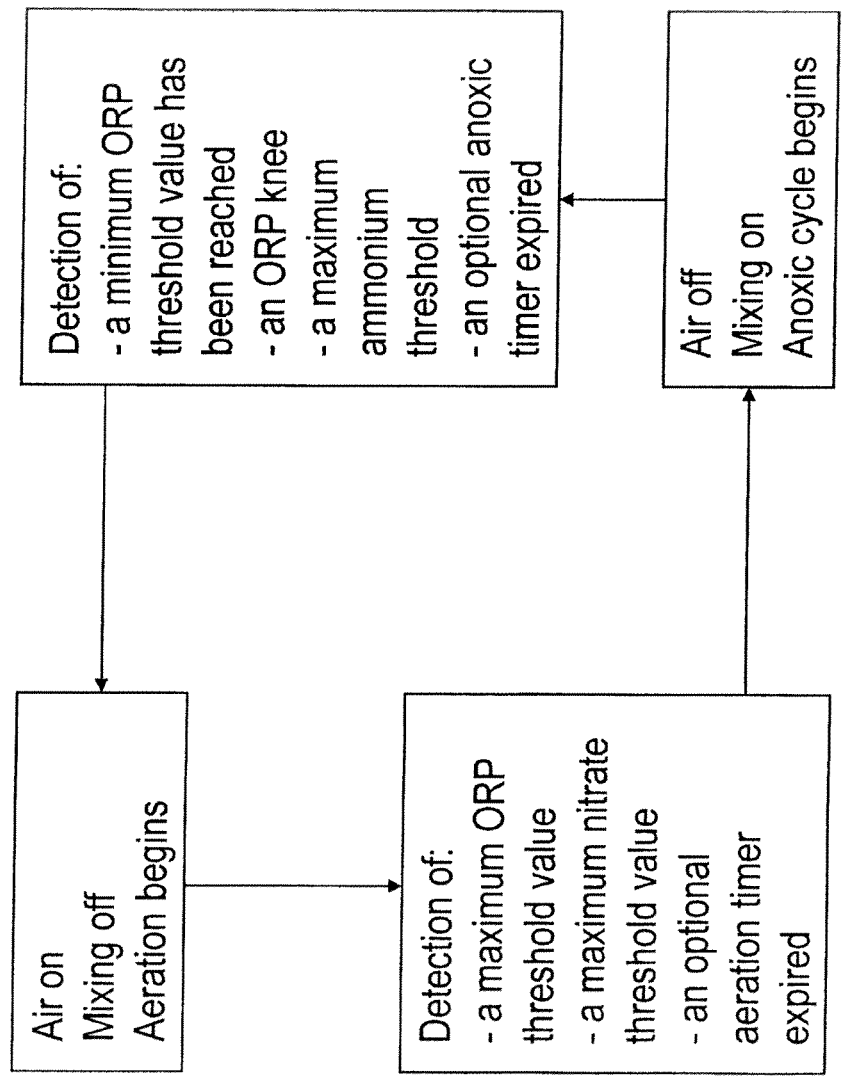
FIG. 7 is a flowchart that illustrates the logic of another embodiment of the present invention.

By way of example, FIG. 7 is a flow diagram of one embodiment of a process of the present invention. As illustrated, a system may begin operation in an aerobic process, and aeration may continue until either the detection of a maximum nitrate level, detection of a maximum ORP threshold, or completion of an optional time period. In some embodiments, a default maximum nitrate level of about 4 mg/L may be used, and in other embodiments a maximum nitrate level up to about 30 mg/L may be used, including all intermediary values from about 3 mg/L to about 30 mg/L. In addition, some embodiments may use a default ORP maximum level of about 300 mV. In addition, the aerators may cycle on and off or between high and low speeds during the aerobic cycle in order to keep the DO concentration between predetermined levels. In one embodiment, the DO concentration is maintained between about 0.5 mg/L and about 4.0 mg/L.

As further illustrated in FIG. 7, after aeration is terminated, mixing is initiated without aeration until either a minimum ORP threshold is detected, an ORP knee is detected, a maximum ammonium value is detected, or an optional predetermined time period expires. By way of example, the maximum ammonia value in some embodiments may be from about 1 mg/L to about 30 mg/L, including each increment in that range. In some embodiments, a minimum ORP threshold may be a value set below where an ORP knee is detected, such that aeration is resumed in the event an expected ORP knee is not detected. In even further embodiments, detection of an ORP knee may require that the ORP value be below a predetermined ORP value that is above the value at which an ORP knee is expected to occur, such as ORP-2 in FIG. 8. Using this predetermined ORP-2 threshold value as a prerequisite for restarting aeration may avoid false detections of an ORP knee.

Figure 8:
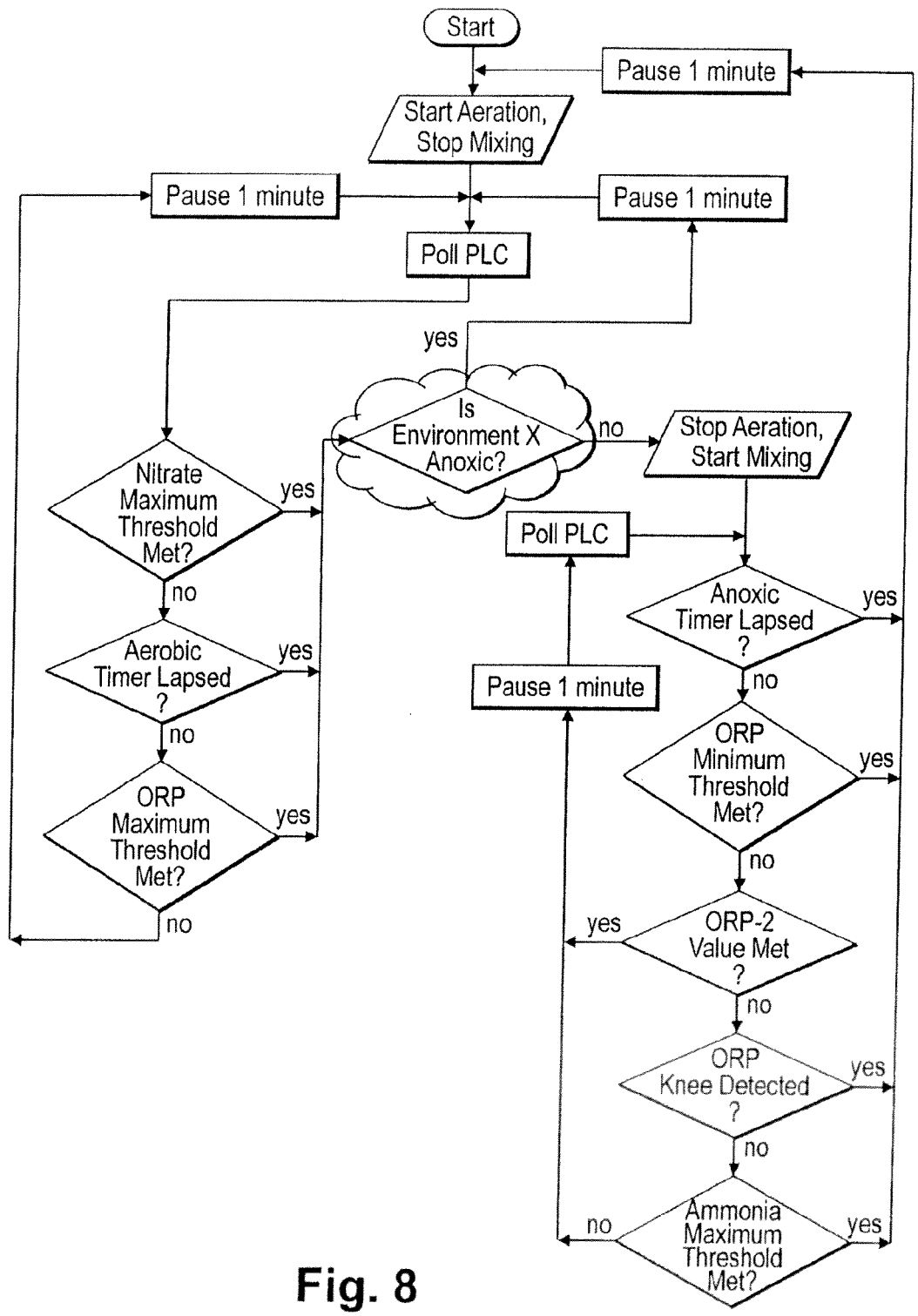
FIG. 8 is a flow chart that illustrates the logic of another alternative embodiment of the present invention.

In some embodiments using the exemplary process illustrated in FIGS. 7 and 8, the optional time periods for stopping the aerobic and/or anoxic processes may be omitted as a triggering parameter. In some embodiments in which one or more time periods are used as triggering parameters, such as the exemplary embodiment in FIG. 8, the optional time period may be used as a secondary parameter and may be set to extend beyond the expected duration of an ordinary cycle. Finally, in some embodiments of the present invention, the triggering parameters may be arranged in a logical hierarchy, as reflected in FIG. 8. In addition, the exemplary time period pauses shown in FIG. 8 are optional, and in some embodiments those pauses may be omitted, shortened, or lengthened.

In another exemplary embodiment, nitrification and denitrification may be performed simultaneously. By way of example, in some embodiments of a simultaneous nitrification and denitrification process of wastewater, the DO concentration of the wastewater is maintained at a low level, such as from about 0.25 to about 1.0 mg/L, and the wastewater is simultaneously mixed. The DO concentration may be maintained by fluctuating the flow of oxygen to the wastewater in response to dynamically-measured parameters. In some embodiments, the dynamically-measured DO concentration in the system may be used to increase or decrease the supply of DO to the system. In other embodiments, the supply of DO to the system may be adjusted in response to other dynamically-measured parameters. For example, the supply of DO to a system may be reduced if increased nitrate levels are detected, and the supply of DO to the system may be increased if increased ammonia levels are detected. In one embodiment, the nitrate and/or ammonia levels may be maintained in the range from about 0 to about 30 mg/L, or at any intermittent values therein in alternative embodiments. In some embodiments, particular values within that range may be used to trigger an increase or decrease in the supply of DO to the system. In addition, dynamically-measured parameters may be used to control the mixing process as described herein.

In addition, control panel 118 may permit an operator to manually control the processes and system components, such as manually overriding the automatic control and activating or deactivating aeration to the wastewater. In some embodiments, control panel 118 may include an interface for inputting such manual instruction.

The requirements and operational preferences for a particular system may vary based upon the facility or at various times for a particular facility. In some embodiments of the present invention, system requirements and preferences, such as trigger points and particular operational parameters, can be loaded into control panel 118. In some embodiments, the parameters may be based upon regulatory control or facility discharge Limits. In other embodiments, control panel 118 may be in communication with another programmable logic controller or computer, either at the treatment facility or at another site, in which the operations parameters can be set and transmitted to control panel 118. For instance, an existing facility may have existing PLCs or control panels or hardware such as mixers and aerators, and the present invention could be interfaced with those existing systems, such as by loading software to perform the processes described herein and communicate with the previously-existing structures. In some embodiments, control panel 118 can be remotely accessible, such as through an internet interface. In this regard, control panel 118 may be configured to a network or internet connection.

In many systems, influent wastewater continually flows into the system for treatment, and the amount, flow rate, suspended solids level, and concentration of the wastewater can vary based upon many factors. For instance, certain peak times such as morning and early evening may produce increased wastewater influence, whereas weather conditions such as rain may dilute influent wastewater and require less mixing or aeration. Systems and processes of the present invention that commence and terminate treatment processes based upon dynamically-measured parameters of the system allow for treatment based upon the actual need of the system (such as the wastewater), as opposed to performing treatments based upon preset time periods that do not necessarily reflect the actual real-time treatment need of the wastewater. This dynamic monitoring and control may result in avoiding the mixing or oxygen flow being activated at unnecessary times or unnecessary rates, thereby saving mechanical wear and energy costs.

In addition, some embodiments of the present invention, and particularly control panel 118, may track historical data of the measured parameters and treatment cycles. In addition, other values may be stored, such as temperature, time of day, rain volume, suspended solid concentration, and influent flow rate and volume. These parameters may then be used to perform predictive analysis for treatment cycles and to schedule or anticipate treatment cycles in a given system. In addition, this data may be measured or may be loaded into the system from other sources. For instance, temperature and rain volume could be obtained and loaded, either automatically or manually, from a weather service.

By way of example, some embodiments may regulate the DO concentration at a desired level during the aeration process as explained above. In some embodiments, control panel 118 may store historical data, such as the valve position regulating air flow that was used in previous treatment processes to maintain the DO concentration at the desired level. Then, in subsequent treatment process, the previously-used valve position may be applied as a default value to maintain the DO concentration at the desired level. At the same time, in some embodiments dynamic monitoring and adjustment may continue so that the valve position is adjusted if the desired level is not maintained based on the default value. However, by using the default value based on historical data, some embodiments of the present invention may employ predictive analysis based upon historical data. In yet other embodiments, other historical data could be considered, such as valve positions used for similar concentrations or other factors discussed above. Similarly, predictive analysis may be used based upon historical data concerning treatment process settings with respect to other references, such as time of day, rain volume, suspended so id concentration, and influent flow rate and volume. Similarly temperature may affect the rate of a treatment process, and temperature values may be monitored and stored for past treatment processes and may be used for predictive treatment analysis is subsequent treatments.

Other applications of wastewater treatment and applications unrelated to wastewater treatment are also within the scope the present invention. By way of example, embodiments of the present invention could include treatments in oxidation ditches, sludge treatment, other wastewater treatment processes, water storage, chemical storage, sequencing batch reactors, and pumping stations.

For instance, embodiments of the present invention may be used in sludge treatment processes. Sludge is generally described as settable material that is removed from wastewater, including, for instance, sediment, inert matter, and biological matter. Primary sludge is settable material removed from influent wastewater prior to the wastewater being treated, and secondary sludge is settable material removed after wastewater treatment processes have been performed. Aeration is used in some sludge treatment processes and, in some embodiments of the present invention, control panel 118 can activate and/or deactivate aeration and/or mixing in sludge treatment processes as well as control the aeration rate and/or mixing rate. In some embodiments, the aeration and/or mixing time can be controlled by control panel 118 using predictive analysis based upon previous sludge treatments. In other embodiments, aeration and/or mixing during sludge treatments can be based, in whole or in part, upon the measured amount of suspended solids in the sludge. For instance, increased mixing and/or aeration may be initiated by control panel 118 for sludge having higher levels of suspended solids.

In some wastewater treatment systems, some sludge may be disposed of whereas other sludge (usually some portion of secondary sludge) may be returned to the wastewater treatment tanks so that microorganisms in the sludge can digest waste in the influent wastewater. The sludge returned to the wastewater treatment tanks is termed return activated sludge (RAS) and the disposed sludge is termed waste activated sludge (WAS).

The amount of RAS may be monitored and tracked. In some embodiments of the present invention, the amount of RAS may be a measured parameter for controlling aeration and/or mixing during wastewater treatment processes. For instance, if higher amounts of RAS are introduced into basin 2, control panel 118 may signal that increased mixing and/or aeration is necessary. In some embodiments, the measured value of suspended solids in the wastewater may be a factor for controlling aeration and/or mixing of the wastewater. By way of example, control panel 118 may signal for increased mixing if a high level of suspended solids is measured.

Other embodiments of the present invention may also indicate the amount of R.A.S. to introduce into basin 2 based upon real-time data and/or historical analysis. For instance, if weather conditions such as excessive rain result in diluted influent wastewater, then less R.A.S. may be required and control panel 118 may indicate that less R.A.S. be returned to the system. In some embodiments, the level of suspended solids in influent wastewater can be measured. If the BOD level is high, control panel 118 may indicate that additional RAS be provided to basin 2. In yet other embodiments, historical data may indicate that the influent has increased suspended solids that peak times, such as during mornings when people are preparing for school and work, and control panel 118 may indicate that additional R.A.S. be provided during those times based upon historical data.

The foregoing description of illustrative embodiments of the invention has been presented only for the purpose of illustration and description and is not intended to be exhaustive or to limit the invention to the precise forms disclosed. Numerous modifications and adaptations thereof will be apparent to those of ordinary skill in the art without departing from the scope of the present invention.

It will be understood that each of the elements described above, or two or more together, may also find utility in applications differing from the types described. While the invention has been illustrated and described in the general context wastewater treatment, it is not intended to be limited to the details shown, since various modifications and substitutions can be made without departing in any way from the spirit and scope of the present invention. As such, further modifications and equivalents of the invention herein disclosed may occur to persons skilled in the art using no more than routine experimentation, and all such modifications and equivalents are believed to be within the spirit and scope of the invention as described herein.

We claim:

1. A system for automatically controlling a wastewater mixing process based upon at least one dynamically-measured parameter, comprising:
    a probe for dynamically measuring at least one parameter of wastewater,
    a control panel in communication with the probe, wherein the control panel receives data from the probe representing the measurement of the at least one parameter,
    a mixer in communication with the control panel, wherein the mixer comprises a nozzle in connection with a source of pressurized gas, wherein the nozzle comprises a fluid passage having a plurality of outlets, and wherein the fluid passage is configured to release pressurized gas from the outlets in intermittent bursts to mix the wastewater, and
    one or more aeration devices that are distinct from the mixer;
    wherein the system is configured to activate the mixer upon measurement of a first mixing parameter characteristic of a dynamically-measured parameter and to deactivate the mixer upon measurement of a second mixing parameter characteristic of a dynamically-measured parameter, and
    wherein the system is configured to control the mixing rate of the mixer based upon a measurement of at least one parameter of the wastewater.

2. The system of claim 1 wherein the wastewater is stored in a containment unit.

3. The system of claim 1 further comprising at least one secondary first mixing parameter characteristic and at least one secondary second mixing parameter characteristic, wherein in response to detection or calculation of the secondary first mixing parameter characteristic the mixer is activated, and wherein, in response to detection or calculation of a secondary mixing parameter characteristic, the mixer is deactivated.

4. The system of claim 1 further comprising a second probe for dynamically measuring at least one second parameter of the wastewater.

5. The system of claim 2 wherein the at least one dynamically-measured parameter measured by the probe and the system's historical cycle data are stored by the control panel.

6. A method for controlling the mixing of wastewater that is stored in a containment unit based upon dynamically-measured data, the method comprising the steps of:
    measuring at least one parameter of the substance;
    activating mixing of the substance upon measurement of a first mixing parameter characteristic of a measured parameter;
    controlling a rate of mixing based upon a measurement of at least one parameter of the substance;
    deactivating mixing of the substance upon measurement of a second mixing parameter characteristic of a measured parameter, and-storing historical data concerning treatment cycles, wherein the historical data comprise at least some parameters.

7. The method of claim 6 further comprising activating mixing of the wastewater in response to detection of a secondary first mixing parameter characteristic of a measured parameter instead of in response to the first mixing parameter characteristic if the secondary first mixing parameter characteristic is detected before the first mixing parameter characteristic and deactivating mixing of the wastewater in response to detection of a secondary second mixing parameter characteristic of a measured parameter instead of the second mixing parameter characteristic if the secondary second mixing parameter characteristic is detected before the second mixing parameter characteristic.

8. The method of claim 6 further comprising utilizing the historical data to perform predictive analysis for a treatment process.

9. The system of claim 1 wherein the system comprises a plurality of nozzles each of which is in connection with one or more sources of pressurized gas, and
    wherein each of the nozzles comprises a fluid passage each passage having a plurality of outlets, and wherein the fluid passages are configured to release pressurized gas from the outlets in intermittent bursts to mix the wastewater.

10. A system for automatically controlling a mixing process based upon at least one dynamically-measured parameter, comprising:
    a probe for dynamically measuring at least one parameter of a substance;
    a control panel in communication with the probe, wherein the control panel receives data from the probe representing the measurement of the at least one parameter;
    a mixer in communication with the control panel; and
    one or more aeration devices that are distinct from the mixer;
    wherein the system is configured to activate the mixer upon measurement of a first mixing parameter characteristic of a dynamically-measured parameter and to deactivate the mixer upon measurement of a second mixing parameter characteristic of a dynamically-measured parameter;
    wherein the system is configured to activate the mixer upon measurement of at least one secondary first mixing parameter characteristic to deactivate the mixer upon measurement of a secondary second mixing parameter characteristic;
    wherein the system is further configured with at least one secondary first mixing parameter characteristic and at least one secondary second mixing parameter characteristic, wherein in response to detection or calculation of the secondary first mixing parameter characteristic the mixer is activated, and wherein, in response to detection or calculation of a secondary mixing parameter characteristic, the mixer is deactivated; and
    wherein the system is configured to control the mixing rate of the mixer based upon a measurement of at least one parameter of a substance.

11. The system of claim 10 wherein the substance is wastewater that is stored in a containment unit.

12. The system of claim 10 wherein the mixer comprises a nozzle in connection with a source of pressurized gas, wherein the nozzle comprises a fluid passage having a plurality of outlets, and wherein the fluid passage is configured to release pressurized gas from the outlets in intermittent bursts to mix the wastewater.

13. The system of claim 10 further comprising a second probe for dynamically measuring at least one second parameter of the substance.

14. The system of claim 10 wherein the dynamically-measured parameters measured by the probe and the system's historical cycle data are stored by the control panel.

15. A method for controlling the mixing of wastewater stored in a containment unit based upon dynamically-measured data, the method comprising the steps of:
- measuring at least one parameter of the wastewater;
- activating mixing of the wastewater upon measurement of a first mixing parameter characteristic of a measured parameter;
- controlling a rate of mixing based upon a measurement of at least one parameter of the wastewater;
- deactivating mixing of the wastewater upon measurement of a second mixing parameter characteristic of a measured parameter; and
- activating mixing of the wastewater in response to detection of a secondary first mixing parameter characteristic of a measured parameter instead of in response to the first mixing parameter characteristic if the secondary first mixing parameter characteristic is detected before the first mixing parameter characteristic and deactivating mixing of the wastewater in response to detection of a secondary second mixing parameter characteristic of a measured parameter instead of the second mixing parameter characteristic if the secondary second mixing parameter characteristic is detected before the second mixing parameter characteristic.

16. The method of claim 15 further comprising storing historical data concerning treatment cycles, wherein the historical data comprise at least some measured parameters.

17. The method of claim 15 wherein the mixing is performed by a mixer that comprises a nozzle in connection with a source of pressurized gas, wherein the nozzle comprises a fluid passage having a plurality of outlets, and wherein the fluid passage is configured to release pressurized gas from the outlets in intermittent bursts to mix the wastewater.

18. The method of claim 16 further comprising utilizing the historical data to perform predictive analysis for a treatment process.

* * * * *